(12) United States Patent
van der Lee (10) Patent No.: US 9,323,298 B2
(45) Date of Patent: Apr. 26, 2016

(54) ADAPTIVE POWER MANAGEMENT

(75) Inventor: Reinierus Hendricus Maria van der Lee, Lake Forest, CA (US)

(73) Assignee: Broadcom Corporation, Irvine, CA (US)

(*) Notice: Subject to any disclaimer, the term of this patent is extended or adjusted under 35 U.S.C. 154(b) by 1046 days.

(21) Appl. No.: 13/173,165

(22) Filed: Jun. 30, 2011

(65) Prior Publication Data

US 2013/0007473 A1    Jan. 3, 2013

(51) Int. Cl.
*G06F 1/00* (2006.01)
*G06F 1/20* (2006.01)
*G06F 1/32* (2006.01)
*H04M 1/24* (2006.01)

(52) U.S. Cl.
CPC .............. *G06F 1/206* (2013.01); *G06F 1/3212* (2013.01); *G06F 1/3287* (2013.01); *G06F 1/3296* (2013.01); *H04M 1/24* (2013.01); *Y02B 60/1275* (2013.01); *Y02B 60/1282* (2013.01); *Y02B 60/1285* (2013.01); *Y02B 60/1292* (2013.01)

(58) Field of Classification Search
USPC ........................... 713/300, 310, 320, 330, 340
See application file for complete search history.

(56) References Cited

U.S. PATENT DOCUMENTS

| | | | | |
|---|---|---|---|---|
| 5,452,277 A | * | 9/1995 | Bajorek et al. | 369/53.18 |
| 5,870,613 A | * | 2/1999 | White et al. | 713/300 |
| 2003/0056127 A1 | * | 3/2003 | Vaglica | 713/300 |
| 2004/0199599 A1 | * | 10/2004 | Nichols et al. | 709/208 |
| 2005/0039063 A1 | * | 2/2005 | Hsu et al. | 713/324 |
| 2006/0265610 A1 | * | 11/2006 | Kim | 713/300 |

* cited by examiner

*Primary Examiner* — Kim Huynh
*Assistant Examiner* — Paul J Yen
(74) *Attorney, Agent, or Firm* — McDermott Will & Emery LLP (57) ABSTRACT

Disclosed are various embodiments of adaptive management of a device. The adaptive management includes, e.g., power management, energy management, and diagnostics. In one embodiment, a device including a power management unit (PMU) communicatively coupled to a processor is configured to transmit a status notification to the processor in response to an interrupt signal; obtain a high level state command from the processor in response to the status notification, and modify power operation of the device in response to the high level state command. In another embodiment, a method for charging a power source includes obtaining, by a PMU of a device, operational characteristics of a power supply in communication with the device; determining a power supply type based at least in part upon the operational characteristics; and controlling charging of the power source based at least in part upon the power supply type.

34 Claims, 5 Drawing Sheets

ADAPTIVE POWER MANAGEMENT

BACKGROUND

Many devices utilize a power management unit (PMU) to govern power functions of digital platforms. Digital state machines are used in the power management integrated circuit (PMIC) to implement the power management functions. The state machines are defined during design of the PMU and hardcoded during implementation of the device. For example, a battery charger is hardcoded to accept power from a single well defined source. Other sources are rejected by the battery charger.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
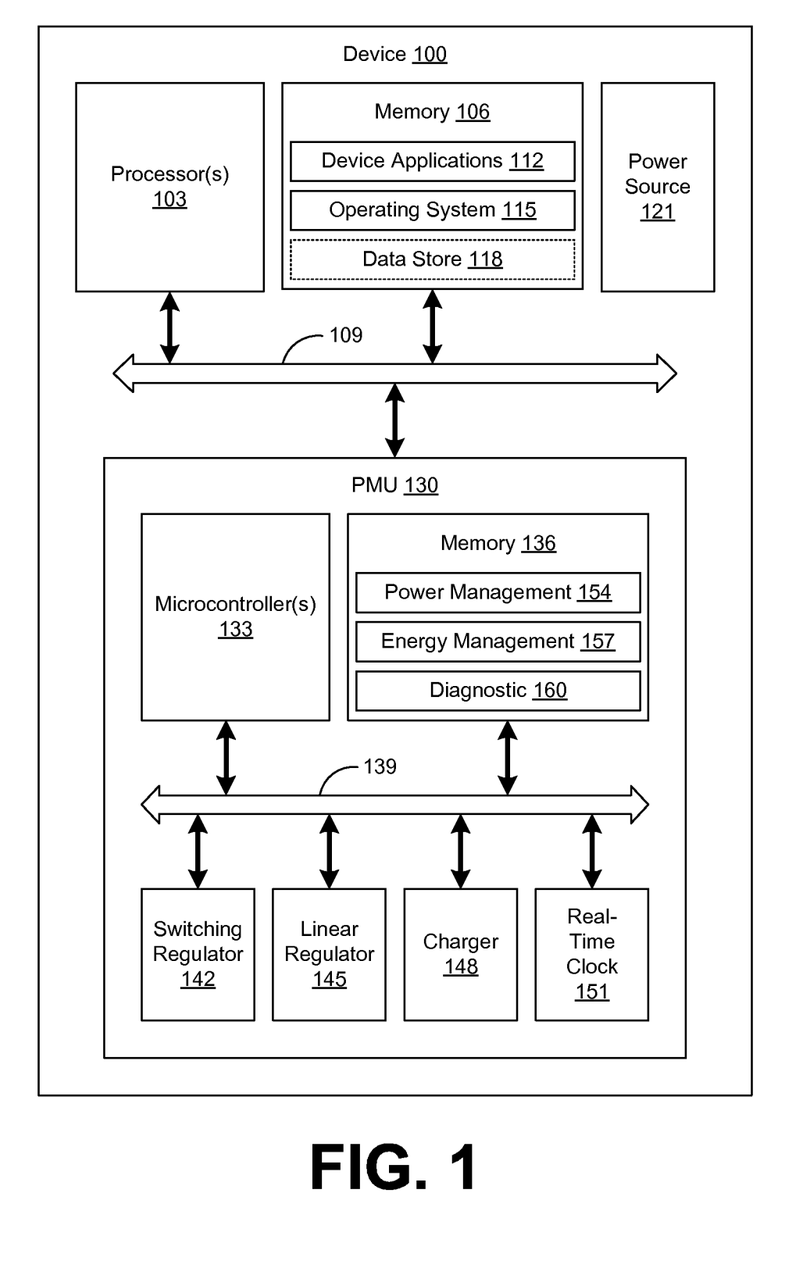
FIG. 1 is a schematic block diagram of a device including a power management unit (PMU) in accordance with various embodiments of the present disclosure.

With reference to FIG. 1, shown is a schematic block diagram of a device 100 such as, but not limited to, a mobile phone, personal digital assistant (PDA), laptop computer, electronic tablet, or other electronic device including a self-contained power source 121 such as, e.g., a battery or other rechargeable power source. The device 100 includes at least one processor circuit or system-on-chip (SoC), for example, having a processor 103 (e.g., a system processor) and a memory 106, both of which are coupled to a local interface 109. The processor 103 may represent multiple processors 103 and the memory 106 may represent multiple memories 106 that operate in parallel processing circuits, respectively. The device 100 includes other components (e.g., keypads, displays, speakers, microphones, amplifiers, interfaces, switches, antennas, etc.) to implement the functionality of the device 100 as can be appreciated. The local interface 109 may comprise, for example, a data bus with an accompanying address/control bus or other bus structure as can be appreciated.

Stored in the memory 106 are both data and several components that are executable by the processor 103. In particular, stored in the memory 106 and executable by the processor 103 are device applications 112 and potentially other applications that may be implemented by the device 100. In addition, an operating system 115 may be stored in the memory 106 and executable by the processor 103. Also stored in the memory 106 may be a data store 118 and other data.

It is understood that there may be other applications that are stored in the memory 106 and are executable by the processor 103 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

The device 100 also includes a power management unit (PMU) 130 that manages power functions of the device 100 and its components. The PMU 130 may be a separate integrated circuit or may be included as part of a SoC. The PMU 130 includes at least one processor circuit, for example, having a microcontroller 133 and a memory 136, both of which are coupled to an internal interface 139. The microcontroller 133 may represent multiple microcontrollers 133 and the memory 136 may represent multiple memories 136 that operate in parallel processing circuits, respectively. In addition, the PMU 130 may include, e.g., one or more switching regulator(s) 142, linear regulator(s) 145, current source(s), power source (e.g., battery) charger(s) 148, real-time clock 151, analog-to-digital (ND) converter(s), and/or other components coupled to the internal interface 139. The internal interface 139 may comprise, for example, a data bus with an accompanying address/control bus, serial bus, or other bus structure as can be appreciated. In some embodiments, the device 100 may include a backup battery to supply backup power to the PMU 130.

Stored in the memory 136 are both data and several components that are executable by the microcontroller 133. In particular, stored in the memory 136 and executable by the microcontroller 133 are services for power management 154 and energy management 157 of the device 100, as well as service(s) for diagnostics 160 of the PMU 130. Also stored in the memory 136 may be a data store and other data. Memory 136 may include memory that is external to and accessible by the PMU 130. It is understood that there may be other applications that are stored in the memory 136 and are executable by the microcontroller 133 as can be appreciated. Where any component discussed herein is implemented in the form of software, any one of a number of programming languages may be employed.

The memory 106 and 136 is defined herein as including both volatile and nonvolatile memory and data storage components. Volatile components are those that do not retain data values upon loss of power. Nonvolatile components are those that retain data upon a loss of power. Thus, the memory 106 and 136 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

The PMU 130 may coordinate management functions such as, e.g., monitoring power usage and power source charge, power source charging, controlling power distribution, regulating the real-time clock, and controlling power saving functions such as standby, hibernate, sleep, and shutdown of components of the device 100 and/or the device 100 itself. In addition, the PMU 130 may carry out other functions or features such as, e.g., adaptive power management of the device 100, communication with processor 103 through high level state commands, identification of power supply types, self-testing of PMU 130 for diagnostics, etc. Services may be executed by the microcontroller 133 for implementation of the functions.

For example, power management services 154 may include communication between the PMU 130 and the processor 103 (e.g., a baseband or application processor) using high level system state commands instead of through the use of interrupt requests (IRQs). In some implementations, the communication between the PMU 130 and the processor 103 is limited to high level messaging. Currently, PMU drivers executed by the processor 103 target individual features of the PMU 130. High level messaging can reduce loading on the system processor 103 by off-loading control of features or functions from the system processor 103 to the PMU 130. In addition, drivers executed by the processor 103 may be simplified (or even eliminated) by using high level messaging instead of device specific interrupts. The PMU 130 may be configured to internally service the IRQs generated by the PMU 130 and only forward the IRQs to the processor 103 that require a system response. The PMU microcontroller 133 translates the high level system state commands into instructions to implement the individual features or functions.

The high level system state commands may include requests for features that do not require an immediate response such as, e.g., go to a sleep (or standby) mode or a hibernate mode and other functions that may be implemented by the PMU 130. A sleep (or standby) mode may reduce power to some device components (e.g., processor 103 and/or memory 106), and deactivate or switch off the power supply to other device components that are not in use such as, e.g., a device display to reduce power consumption. A hibernate mode may copy the current state and content of the device 100 to a non-volatile portion of the memory 106 and deactivate or switch off the processor 103, memory 106, device display, and other components of the device. The sleep (or standby) mode allows for rapid restoration of the device operation while the hibernate mode restores the saved state and content information before returning to operation.

Figure 2:
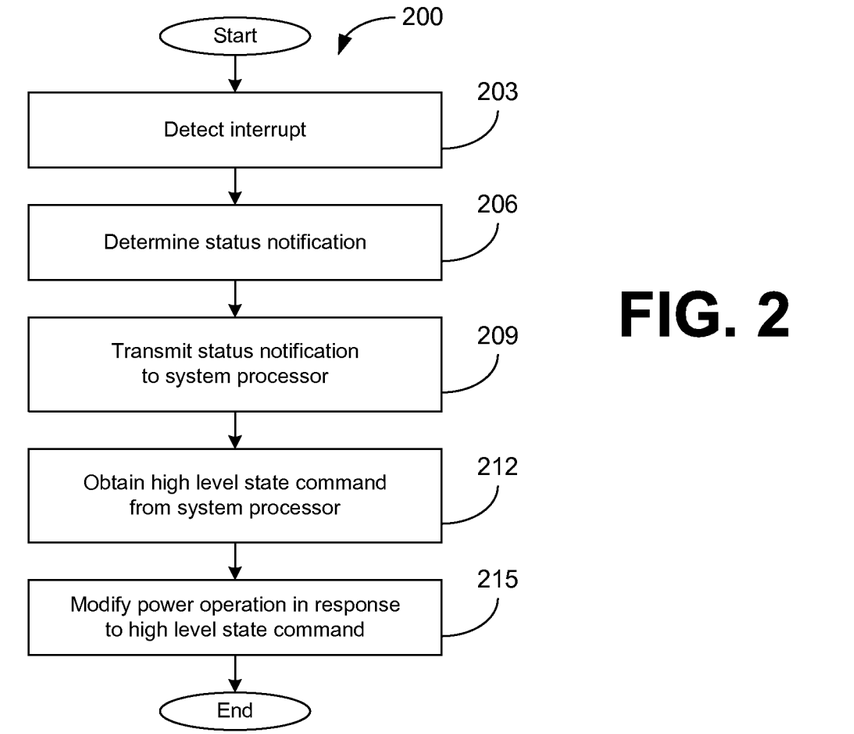
FIGS. 2-4 are flowcharts illustrating examples of power management services implemented by the PMU of FIG. 1 in accordance with various embodiments of the present disclosure.

The PMU 130 may be configured to communicate with the system processor 103 (e.g., a baseband processor) using high level system state commands and/or other high level messaging. For example, the microcontroller 133 of the PMU 130 may execute a power management service 154 that enables the communication using the high level commands. Referring to FIG. 2, shown is a flowchart 200 illustrating an example of the communication between the PMU 130 and system processor 103 using high level system state commands. The PMU 130 monitors for interrupts or other changes in the operation of the device 100 (FIG. 1). Beginning with block 203, an interrupt (or other change in power operation) is detected by the microcontroller 133 (FIG. 1). In response to the interrupts, the PMU 130 (FIG. 1) determines a status notification based (at least in part) upon the interrupt in block 206. Other information may also be used by the PMU 130 to determine the status notification such as, e.g., other detected interrupts, power usage levels, current flows, and other information monitored by the PMU 130. For example, different status notifications may be determined when an interrupt is detected depending upon the presence of other interrupts and/or other conditions monitored by the PMU 130.

In block 209, the status notification is transmitted to the system processor 103 (FIG. 1). In response to the status notification, the processor 103 provides a high level state command and the PMU 130 obtains the high level state command in block 212. For example, the status notification may indicate that the available power or voltage of the power source 121 is below a predefined level. In response, the processor may provide a high level state command requesting the PMU 130 enter the sleep mode, the hibernate mode, etc. The high level state commands may include requests for states that do not require an immediate response by the PMU 130.

Figure 3:
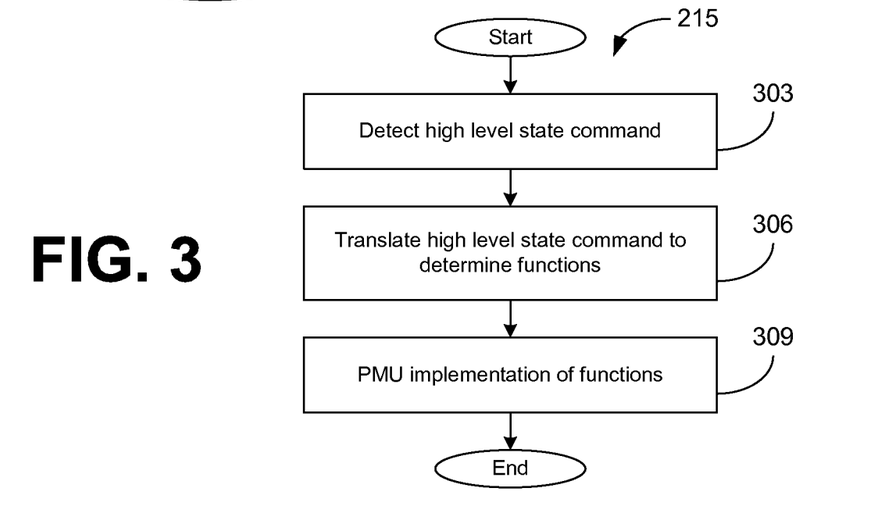

In block 215, the PMU 130 modifies the power operation of the device 100 in response to the high level state command. For example, the PMU 130 may shutdown one or more components of the device 100 or modify the power or voltage setting of a component. Referring next to FIG. 3, shown is a flowchart illustrating an example of power operation modification (block 215) in response to the high level state command. To begin, the PMU 130 detects that the high level state command has been received from the processor 103 in block 303. The PMU 130 (FIG. 1) translates the high level state command in block 306 to determine what functions are to be implemented by the PMU 130 and/or the sequence of the functions based upon the high level state command. In some cases, high level state command may correspond to a predefined set of functions. In other implementations, the functions and/or their sequence may vary based upon operational conditions of the device 100 (FIG. 1). For example, if components of the device 100 are to be shutdown over a period of time, the sequencing of the deactivation may be based upon the current power usage of the components. The functions are then implemented by the microcontroller 133 in block 309. Further high level messages may be exchanged with the processor 103 such as additional status notifications and/or requests to coordinate the implementation of the functions.

Referring back to FIG. 2, the PMU 130 continues to monitor for interrupts or other changes in the power operation of the device 100 during the high level messaging between the PMU 130 and the system processor 103 as can be understood. Subsequent indications may result in additional communication between the PMU 130 and system processor 103 using high level system state commands. Thus, different high level messaging sequences may be ongoing at the same time.

In addition, the PMU 130 may continue to monitor for interrupts or other operational changes while the processor 103 is in sleep mode or hibernate mode. In some embodiments, the PMU 130 may automatically modify the power operation of the device 100 based upon a previous high level state command without restoring the processor 103 to operation. For example, the device 100 may have different sleep mode levels. The PMU 130 may enter a first level of sleep in response to the high level state command. If the available power or voltage of the power source 121 is below a predefined threshold for a predefined period of time after entering the first sleep level, then the PMU 130 may initiate a second sleep level where power usage is further reduced. In alternative embodiments, the PMU 130 may restore the processor 103 from the sleep mode or hibernate mode in response to an interrupt before transmitting the status notification in block 209.

Power management services 154 (FIG. 1) may implement other functions or features such as adaptive power management based upon patterns of power consumption and/or usage of the device 100 (FIG. 1). The PMU 130 may monitor the power usage of different device components over time to "learn" usage patterns of the device 100. The monitoring may include high level messaging between the PMU 130 and system processor 103 regarding the operation of the device components. Depending on the usage of the device 100, system settings (e.g., power regulator 142 and 145 settings) may be automatically adjusted to improve or maximize the life of the power source 121. Voltage settings and/or current flow limitations may be adjusted to reduce power consumption. In addition, power supplies may be temporarily switched off when use is unlikely and/or when instantaneous response is not needed.

A set of power management rules may be established and/or adapted by the PMU 130 (e.g., through the use of an expert system or other pattern recognition scheme) to adjust the power operation of the device 100 based upon the monitored usage. In some cases, a predefined set of rules may be stored in memory 136 and adapted by the PMU 130. The learned patterns may then be used by the PMU 130 to automatically adjust power operation of the device 100. The adaptive rules may be based upon, e.g., time of use and/or combinations of components in use. The adaptive rules may also apply to one or more components of the device 100, to the device 100 as a whole, or combinations thereof.

For example, the PMU 130 may detect a pattern of very low power consumption between the hours of 1 a.m. and 6 a.m. The PMU 130 may establish or adapt a rule that automatically places the device 100 in a hibernation mode at 1 a.m., if no other activity is ongoing, and to restore the device to, e.g., a sleep mode at 6 a.m. The rule may then be adapted if the PMU 130 detects a pattern of repeated activity between 1 a.m. and 2 a.m. so that the device 100 is placed in hibernation mode at 2 a.m. instead of 1 a.m. In other implementations, the rule may be adapted to place the device 100 in a sleep (or standby) mode at 1 a.m. and a hibernate mode at 2 a.m. In alternative implementations, components of the device 100 that have a pattern of no usage after 1 a.m. may be shutdown at 1 a.m. in preparation for placing the device 100 in a hibernate mode at 2 a.m.

Figure 4:
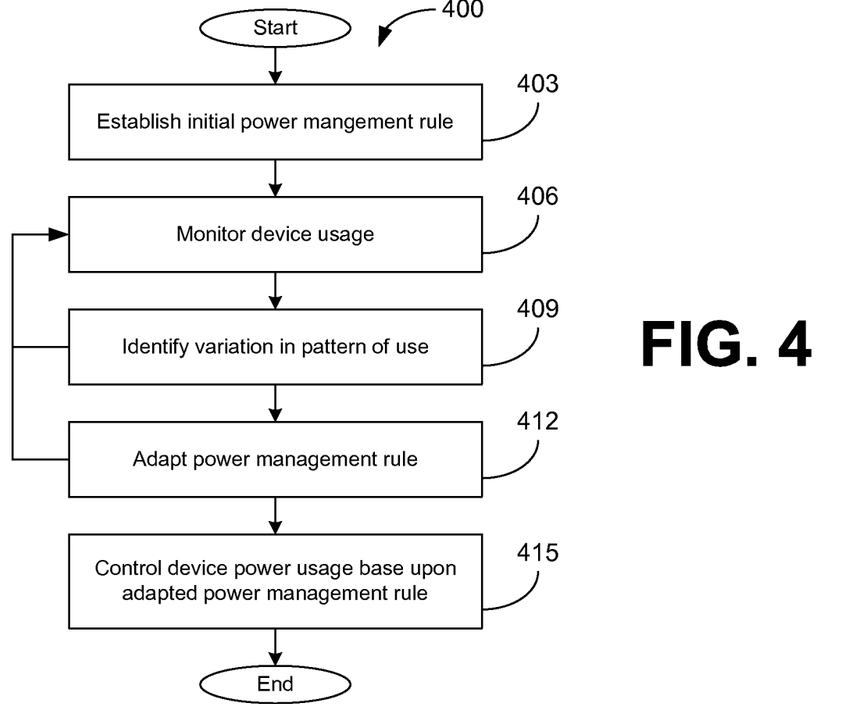

Referring now to FIG. 4, shown is a flowchart 400 illustrating an example of adapting the power management rules. Beginning with block 403, one or more initial power management rule(s) are established. In one implementation, one or more rule(s) are selected from a predefined set of rules that are stored in memory 136 (FIG. 1). In another implementation, the power management service 154 (FIG. 1) may define the initial rule(s) based upon, e.g., the type of the PMU and/or the components included in the device 100. In some implementations, the initial rule(s) may be defined based upon predefined patterns associated with the device 100. The initial power management rule(s) and associated pattern(s) may be stored in memory 136 or other appropriate location.

The PMU 130 (FIG. 1) monitors device usage in block 406 based upon the characteristics of the power supplied by the PMU 130. For example, the PMU 130 may measure the power, voltage, and/or current levels being supplied to individual or groups of device components with respect to time. Patterns of component and device 100 use may then be identified or learned (e.g., through the use of an expert system or other pattern recognition scheme) based upon the monitored information in block 409. Variations in the pattern of use may be identified based upon previously identified patterns (e.g., a change in the pattern frequency, period, usage level, etc.) associated with a power management rule. In some cases, the learned pattern may not have been previously identified. If the pattern had not been identified previously, then a new power management rule may be established by the PMU and monitored for future adaptation based upon the newly identified pattern.

If the identified pattern varies sufficiently from the pattern associated with an existing power management rule, then the rule may be adapted in block 412 to reflect the change in the identified usage pattern. For example, if the power usage has increased during periods that were previously identified with minimal power usage, then power management rules associated with sleep and hibernate modes may be adapted to take into account the change in activity. The adaptation of the rules may be based upon predefined thresholds for power usage of individual device components or for the device 100 as a whole. In addition, the change in usage may be required to persist for a predefined period of time and/or frequency before the rule is modified. For example, if the increased usage occurs once every month, than the power management rules may not be adapted. However, if the increased usage occurs every day for a week, then the rule may be adapted at the end of the 7 day period.

The PMU 130 continues to monitor device usage (block 406) and identify patterns of use (block 409) during operation of the device 100. The adaptive power management rules based upon the identified patterns may be used to reduce power usage of the device components in block 415 to improve or maximize the life of the power source 121. For example, if some components are not used during identified periods of time, the PMU 130 may shutdown those components during the identified periods to reduce loading of the power source 121. In some cases, the components may only be deactivated if power usage reaches a predefined level during the identified periods. In addition, the PMU 130 may monitor the times when the device 100 enters and exits the sleep and/or hibernate modes as well as the device 100 and component power usage at those times. In this way, the power management rules may be adapted to anticipate the device usage at those times.

Adaptive power management rules may also be utilized in the translation of the high level state commands communicated between the system processor 103 and the PMU 130. For example, if a high level state command is obtained (block 212 of FIG. 2) requesting the PMU 130 enter the sleep mode, the functions and their order to place the device 100 in sleep mode may be determined based upon the adaptive power management rules. If the request is received during a period of that is characterized by high device usage, a first set of functions may be implemented to modify the power operation of the device 100 (block 215). If the request is received during a period where little or no usage had been monitored, then a second set of functions may be implemented to place the device 100 into a deeper sleep level.

Various operating temperatures of the device 100 may also be monitored to manage the thermal heating of the device 100 based upon the adaptive power management rules. In other implementations, thermal models of the device components may be used by the PMU 130 to predict the heating based upon voltage and current measurements. Adaptive power management rules may be developed to maintain the temperatures of the device 100 within defined limits. For example, unneeded components may be shutdown to reduce heating within the device 100. In addition, high current applications may be limited based upon the power management rules to reduce heating in the device 100. For example, charging of the power source 121 (FIG. 1) during periods of high use may be limited or controlled based upon the power management rules. The charging sequence or level may be adjusted based upon the applications that are currently in use.

The PMU 130 (FIG. 1) may also include energy management services 157 (FIG. 1) such as, e.g., charging of a power source 121 (FIG. 1), modeling of the power source 121, and tracking the health of the power source 121. For example, one energy management service 157, among others, may adapt the charging of the power source 121 by a power source charger 148 (FIG. 1) based upon the type of a power supply in communication with the device 100. In general, a charger 148 only accepts voltage and current from a well defined power supply. However, many other alternative power supplies are being proposed to charge various devices 100. For example, green sources of energy such as solar cells, fuel cells, thermal electric generators, and user propelled dynamos may be used as a power supply. However, the variation in their energy capabilities makes them unusable with a standard charger 148.

Figure 5:
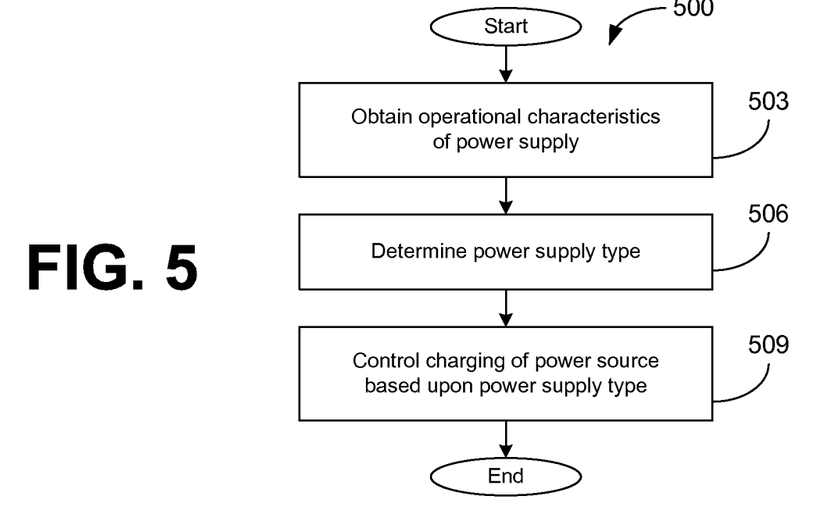
FIGS. 5-7 are flowcharts illustrating examples of energy management services implemented by the PMU of FIG. 1 in accordance with various embodiments of the present disclosure.

Referring to FIG. 5, shown is a flowchart 500 illustrating an example of adaptive charging of a power source. In order to utilize a wide variety of power supplies, the charger 148 adapts its operation to the type of power supply. In this way, the charger acts as a power hub that adapts is operation to conform to the power supply in communication with the device 100. For example, the charger 148 may include linear chargers, switching chargers, and/or down converters configured to convert the energy levels to the proper state for charging the power source 121.

Figure 6:
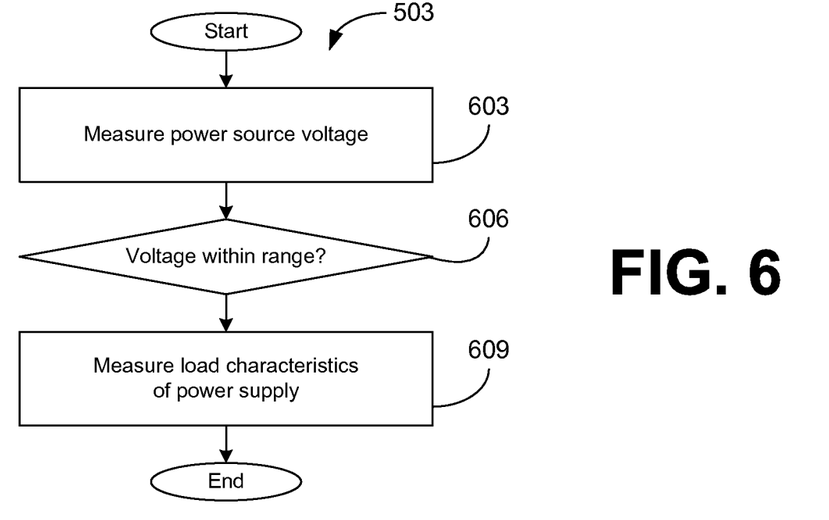

Beginning with block 503, operational characteristics of a power supply are obtained after the power supply is connected with the device 100. Referring to now to FIG. 6, shown is a flowchart illustrating an example of obtaining the operational characteristics (block 503) of the power supply. Initially the no-load voltage level of the power supply is measured in block 603. If the voltage level falls within a defined range (block 606), then the power supply may be considered a standard supply and charging may be controlled appropriately. If the voltage level is outside the defined range in block 606, then the power supply is considered a non-standard supply and load characteristics of the power supply are obtained in block 609. In some implementations, the load characteristics are also obtained when the voltage falls with a defined range to further determine the power source type.

The current and voltage capabilities of the power supply may be tested by adjusting the load on the power supply to measure the effects on the current and voltage. As the power supply reaches the limits of its capabilities, the voltage drops noticeably with a small change in load. Such testing may be performed with incremental changes in the loading for limited periods of time. Care must be taken to avoid damaging the power supply and the device 100 during such testing.

Referring back to FIG. 5, the power supply type is determined in block 506 based upon the obtained operational characteristics. For example, the power supply type may be identified based upon a comparison of the load characteristics with templates (e.g., a voltage range that corresponds to a specific current level) that are associated with various power supply types or classifications. In other embodiments, a mathematical model corresponding to a power supply type may be correlated with the measured load characteristics. In block 509, operation of the charger 148 is controlled during charging of the power source based upon the power supply type. The voltage and/or the current of the power source charger 148 may be controlled within predefined limits associated with the identified power supply type. For example, the charging current may be adjusted to maintain the power supply voltage above a predefined threshold. In other implementations, the power source charging voltage is adjusted to maintain the current below a predefined threshold. Operation of a switched regulator or a linear regulator may be controlled to maintain the charging within the limits or to optimize the power source charging conditions based upon the power supply capabilities.

Adaptive charging of the power source 121 may also be applied to wireless charging. A wireless power supply (e.g., a charging pad) is coupled to the device 100 through resonant circuits for power transfer. Normally, the wireless power supply probes to determine whether a load is present by pinging at regular intervals and looking for a response from a suitable load. The load responds by toggling a resistor in the resonant circuit to provide one-way communication with the wireless power supply by modulating the circuit impedance. This may be extended to include near field communication (NFC) that is controlled by the PMU 130. NFC allows for bidirectional communication between the wireless power supply and the PMU 130. NFC is commonly used for electronic payments using a mobile electronic device.

With respect to FIG. 5, operational characteristics of the wireless power supply may be obtained from the wireless power supply in block 503 using NFC controlled by the PMU 130. The information exchanged between the wireless power supply and the PMU 130 may then be used to determine the power supply type (and capabilities) in block 506. In block 509, the operation of the charger 148 is controlled during charging of the power source based upon the power supply type. In addition, NFC between the wireless power source and the PMU 130 allows for adaptation during charging of the power source. For example, if loading of the wireless power source changes while the power source 121 is being charged, the wireless power source can communicate the change to the PMU 130 using NFC. The PMU 130 may then alter the operation of the charger 148 (e.g., increase or decrease the charging rate) based upon the communicated information.

Communication between the PMU 130 and a wireless or other type power supply may also be established through a secondary communication such as, e.g., a blue tooth or other wireless connection. The information exchanged between the power supply and the PMU 130 over the secondary channel may be used to determine the power supply type (and capabilities), which can be used for control of the operation of the charger 148.

Energy management services 157 (FIG. 1) may also implement other functions or features such as adaptive modeling of the power source 121 of the device 100 (FIG. 1). Power sources 121 such as batteries exhibit different operational characteristics during use (or discharge) and charging. The internal battery resistance behaves differently during discharging and charging of the battery. For this reason, separate discharging and charging models can be used to monitor the capacity and health of the power source 121 and/or to control the charging of the power source 121. In addition, the internal battery resistance varies in a non-linear fashion over the life of the battery. The variation may be accounted for by adaptively modeling the power source 121 during use to optimize the operation over the life of the power source 121.

Accurate modeling of the power source 121 also ensures operation within safety limits of the power source 121. For example, accurate modeling of lithium-ion batteries provides the ability to maximize charging of the battery while maintaining charging currents and voltages within allowable safety limits. In some cases, allowable limits during battery charging have been mandated through legislation increasing the importance of accurate modeling over the life of the power source 121. Accurate modeling may also reduce the charging cycles of the power source 121 and thereby extend the life of the power source 121. This can be very important in the case were a non-replaceable power source 121 is used in the device 100.

Figure 7:
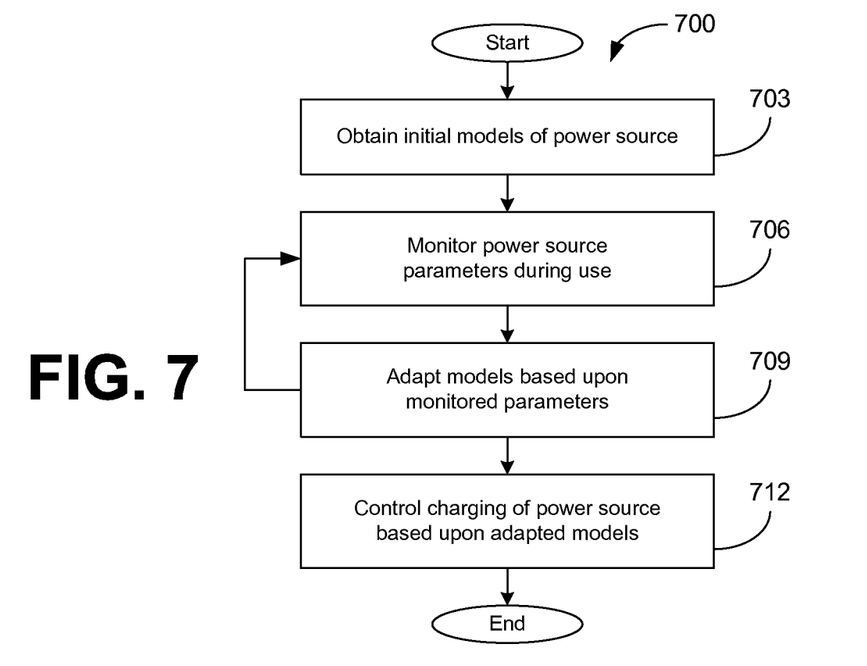

Referring to now to FIG. 7, shown is a flowchart 700 illustrating an example of adaptively modeling a power source 121 (FIG. 1). Beginning with block 703, initial charging and discharging models are obtained for the power source 121. The initial charging and discharging models may be generic models of the power source 121 based upon manufacturer information. In some cases, the models are selected from a group of models based upon the power source type. In other cases, the initial charging and discharging models may be based upon models of the power source 121 that were previously adapted. For example, the initial adaptation(s) of the power source models may be stored in memory 136 (FIG. 1). These stored models may then be utilized as the initial models for a replacement power source. By utilizing a previously adapted model as the initial model, more accurate predictions of the state of the power are possible.

In block 706, various parameters such as, e.g., terminal voltage and current and power source temperature may be monitored by the PMU 130 (FIG. 1). The voltage and current of the power source 121 may be measured on a period basis and correlated with the status (e.g., charging or discharging) of the power source 121. For example, coulomb counting may be utilized to monitor the actual charge flowing from or to the power source 121.

The power source models are adapted based upon the monitored parameters, and thus the actual performance of the power source 121, in block 709. For example, the internal resistance of the power source 121 can be adapted based upon the measured terminal voltage can current using, e.g., a weighted average of previous measurements. In this way, either the charging or discharging model tracks changes in the power source 121 characteristics over time. The modeled internal resistance may also be confirmed based upon the measured temperature of the power source 121. Deviations in temperature when compared to the charging energy may indicate inaccuracies in the measurements or a fault or failure (e.g., an internal short) within the power source 121. The PMU 130 continues to monitor the power source parameters (block 706) and adapt the power source models (block 709) during operation of the device 100.

The adapted charging model of the power source 121 may be used to control the operation of the charger 148 (FIG. 1) during charging of the power source in block 712. Charging of the power source 121 may be maximized based upon the adapted charging model. Variations in the internal resistance of the power source 121 over time may be accounted for by the PMU 130 based upon the adapted model.

The adapted charging and discharging models may also be utilized to indicate the capacity and/or health of the power source 121 through a "fuel gauge" or other visual indication provided by the device 100. The fuel gauge can provide an indication of current capacity of the power source 121 (e.g., a battery) based upon the adapted discharging model and the measured terminal conditions. In addition, the fuel gauge may provide an indication of the health of the power source 121 based upon the adapted charging and discharging models. For example, the health of a battery may be determined based upon the internal resistance of the adapted charging and/or discharging models. As the internal resistance increases, a corresponding health may be determined through a corresponding resistance curve or other appropriate determination. The health of the power source 121 may be indicated separately for discharging and charging or may be indicated as an overall health. In some implementations, a recommendation for power source replacement may be provided based upon the determined health.

Diagnostic services 160 (FIG. 1) may also implement other functions or features such as self-testing of the PMU 130 (FIG. 1). The microcontroller 133 (FIG. 1) of the PMU 130 may be configured to perform internal self-tests. The ability to perform self-testing can reduce (or even eliminate) the time for ATE (automatic test equipment) testing of the PMU 130. Further, in devices 100 that utilize a SoC including the PMU 130, the ATE may not have access for testing of the PMU 130.

Figure 8:
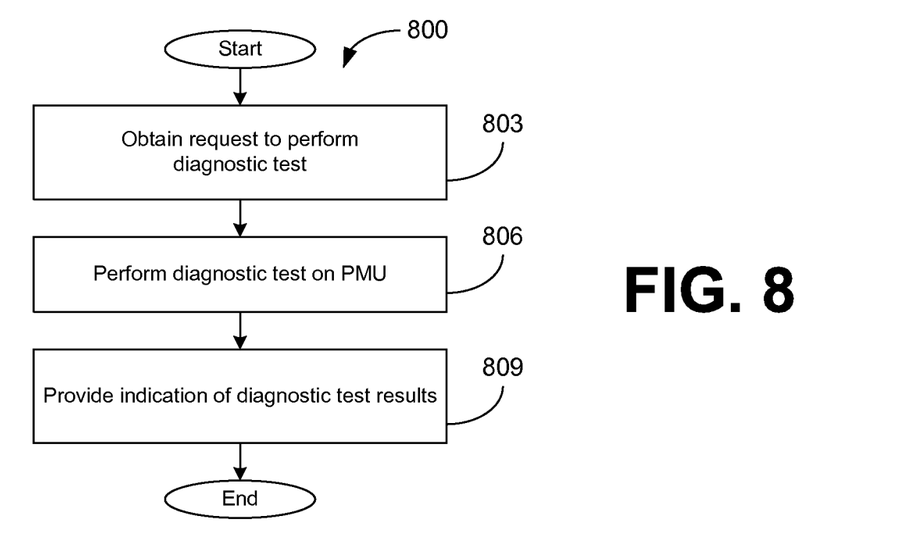
FIG. 8 is a flowchart illustrating an example of diagnostic service implemented by the PMU of FIG. 1 in accordance with various embodiments of the present disclosure.

Referring to now to FIG. 8, shown is a flowchart 800 illustrating an example of diagnostic self-testing of the PMU 130 (FIG. 1). The diagnostic test may be performed by the microcontroller 133 (FIG. 1) of the PMU 130 in response to a test request. Beginning with block 803, a request to perform one or more predefined diagnostic test(s) on the PMU 130 or a series of predefined diagnostic tests on the PMU 130. The request may be a high level state command from a system processor 103 of the device 100 (FIG. 1). In other implementations, the request may be obtained from a testing device in communication with the device 100. For example, ATE may interface with the device 100 and transmit a request to perform a diagnostic test.

In block 806, the predefined diagnostic test(s) are performed on at least a portion of the PMU 130. Testing may be performed on one or more components of the PMU 130 such as, e.g., switching regulator(s) 142, linear regulator(s) 145, current source(s), power source charger(s) 148, real-time clock 151, analog-to-digital (A/D) converter(s), etc., or on combinations of components as can be appreciated. An indication of the test results is provided in block 809. For example, some or all of the actual test data may be provided to the testing device for verification of PMU operation. In other cases, only a positive or negative result may be provided.

A number of software components are stored in the memory 106 or 136 that are executable by the processor 103 or microcontroller 133, respectively. In this respect, the term "executable" means a program file that is in a form that can ultimately be run by the processor 103 and/or microcontroller 133. Examples of executable programs may be, for example, a compiled program that can be translated into machine code in a format that can be loaded into a random access portion of the memory 106 or 136 and run by the processor 103 or microcontroller 133, source code that may be expressed in proper format such as object code that is capable of being loaded into a random access portion of the memory 106 or 136 and executed by the processor 103 or microcontroller 133, or source code that may be interpreted by another executable program to generate instructions in a random access portion of the memory 106 or 136 to be executed by the processor 103 or microcontroller 133, etc. An executable program may be stored in any portion or component of the memory 106 and 136 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Although the electronic power management services 154, energy management services 157, and diagnostic services, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2-8 show the functionality and operation of implementation of portions of power management services 154, energy management services 157, and diagnostic services. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a microcontroller 133 in a PMU 130 or other system. The machine code may be converted from the source code, etc. If embodied in hardware, each block may represent a circuit or a number of interconnected circuits to implement the specified logical function(s).

Although the flowcharts of FIGS. 2-8 show a specific order of execution, it is understood that the order of execution may differ from that which is depicted. For example, the order of execution of two or more blocks may be scrambled relative to the order shown. Also, two or more blocks shown in succession in FIGS. 2-8 may be executed concurrently or with partial concurrence. Further, in some embodiments, one or more of the blocks shown in FIGS. 2-8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic, service or application described herein, including power management services 154, energy management services 157, and diagnostic services, that comprises software or code can be embodied in any non-transitory computer-readable medium for use by or in connection with an instruction execution system such as, for example, a microcontroller 133 in a PMU 130 or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A device, comprising:
a processor; and
a power management unit (PMU) communicatively coupled to the processor, the PMU configured to:
transmit a status notification to the processor in response to an interrupt signal;
obtain a high level state command from the processor, the high level state command provided by the processor in response to the status notification;
determine instructions that indicate a sequence of power operation modifications for a subset of one or more components of the device, wherein an order of the sequence is independent of a time duration between any two temporally adjacent power operation modifications of the sequence, wherein the sequence is adaptively determined based upon at least the high level state command and power usage during operation of the one or more components of the device, and wherein each power operation modification of the sequence of power operation modifications comprises power operation modification of a different component of the subset of the one or more components of the device; and
modify power operation of the subset of the one or more components of the device based on the sequence indicated by the instructions.

2. The device of claim 1, wherein the PMU is further configured to:
detect the interrupt signal; and
determine the status notification based at least in part upon the interrupt signal.

3. The device of claim 2, wherein the status notification is determined based upon a plurality of interrupt signals.

4. The device of claim 2, wherein the status notification is determined based upon the interrupt signal and a power usage level of the device.

5. The device of claim 2, wherein the device is further configured to enter a hibernation mode, wherein the interrupt signal is detected during the hibernation mode of the device.

6. The device of claim 5, wherein the PMU is further configured to restore the processor, in response to the interrupt signal, from the hibernation mode prior to transmitting the status notification.

7. The device of claim 1, wherein the PMU is further configured to:
detect a subsequent interrupt signal; and
further modify power operation of the device in response to the subsequent interrupt signal.

8. The device of claim 1, wherein the PMU is further configured to determine at least one function to modify the power operation of the device based upon the high level state command.

9. The device of claim 8, wherein the at least one function to modify the power operation of the device is further based upon at least one adaptive power management rule.

10. A non-transitory computer-readable storage medium comprising executable instructions for performing a method comprising:
   detecting an interrupt signal;
   transmitting a status notification to a processor, wherein the status notification provides a status of a device and the status notification is based upon at least the interrupt signal;
   obtaining a state command from the processor, wherein the state command is based upon at least the status notification;
   determining a set of instructions that indicate a sequence of power operation reductions for a subset of one or more components of the device, wherein an order of the sequence is independent of a time duration between any two temporally adjacent power operation reductions of the sequence, wherein the sequence is adaptively determined based upon at least the state command and power usage during operation of the one or more components of the device, and wherein each power operation reduction of the sequence of power operation reductions comprises power operation reduction of a different component of the subset of the one or more components of the device; and
   reducing power operation of the subset of the one or more components of the device based on the sequence indicated by the set of instructions.

11. The non-transitory computer-readable storage medium of claim 10, wherein the method further comprises determining the status notification based upon at least the interrupt signal.

12. The non-transitory computer-readable storage medium of claim 10, wherein the method further comprises monitoring at least for interrupts.

13. The non-transitory computer-readable storage medium of claim 10, wherein the status notification is further based upon a power usage level of the device.

14. The non-transitory computer-readable storage medium of claim 10, wherein the status notification comprises information associated with available power of a power source in the device.

15. The non-transitory computer-readable storage medium of claim 10, wherein the state command comprises at least a request for the device to enter into a mode of operation.

16. The non-transitory computer-readable storage medium of claim 15, wherein the mode of operation is a sleep mode or a hibernate mode of the device.

17. The non-transitory computer-readable storage medium of claim 10, wherein the state command comprises at least a request to modify a power setting of at least one of the one or more components of the device.

18. The non-transitory computer-readable storage medium of claim 17, wherein the reducing power operation of the device comprises reducing the power setting of the at least one of the one or more components of the device over a period of time, the period of time being based upon the request.

19. The non-transitory computer-readable storage medium of claim 10, wherein the reducing power operation of the device comprises implementing a sequence of functions to reduce a power setting of at least one of the one or more components of the device, the sequence of functions being based upon the state command.

20. The non-transitory computer-readable storage medium of claim 19, wherein at least one function of the sequence of functions comprises a request to reduce a power setting of the at least one of the one or more components of the device.

21. The non-transitory computer-readable storage medium of claim 10, wherein the method further comprises:
   detecting a subsequent interrupt signal; and
   modifying power operation of the device in response to the subsequent interrupt signal.

22. A computer-implemented method, comprising:
   providing for transmission a status notification to a processor, wherein the status notification provides a status of at least one of power, voltage, or current of a device;
   receiving a state command from the processor, wherein the state command is based upon at least the status notification;
   determining instructions that indicate a sequence of power operation reductions for a subset of one or more components of the device, wherein an order of the sequence is independent of a time duration between any two temporally adjacent power operation reductions of the sequence, wherein the sequence is adaptively determined based upon at least the state command and power usage during operation of the one or more components of the device, and wherein each power operation reduction of the sequence of power operation reductions comprises power operation reduction of a different component of the subset of the one or more components of the device; and
   reducing power operation of the subset of the one or more components of the device based on the sequence indicated by the instructions.

23. The computer-implemented method of claim 22, wherein the providing is performed in response to at least one of an interrupt signal or a change in power operation.

24. The computer-implemented method of claim 22, wherein the reducing power operation comprises implementing at least one of the instructions to reduce the power operation of the device.

25. The computer-implemented method of claim 22, wherein each power operation reduction of the sequence of power operation reductions comprises deactivation of a different component of the subset of the one or more components of the device.

26. The computer-implemented method of claim 24, wherein the sequence of power operation reductions comprises a sequence of deactivating the subset of the one or more components of the device.

27. A system, comprising:
   one or more processors configured to:
      receive a status notification from a power management unit (PMU), wherein the status notification provides a status of a device, the status notification being in response to an interrupt signal; and
      provide for transmission a state command to the PMU, wherein the state command is indicative of one or more reductions to power operation of the device, wherein a sequence of the one or more reductions to power operation is adaptively determined based upon at least the state command and power usage during operation of one or more components of the device, wherein an order of the sequence is independent of a time duration between any two temporally adjacent reductions to power operation of the sequence, and wherein each reduction to power operation of the sequence comprises a reduction to power operation of a different component of the one or more components of the device.

28. The system of claim 27, wherein the status notification is based upon at least a power usage level of the device.

29. The system of claim 27, wherein the state command comprises at least a request to modify a power setting of at least one of the one or more components of the device.

30. The system of claim 27, wherein the state command comprises information associated with a sequence of functions for modifying a power setting of at least one component of the device.

31. A computer-implemented method, comprising:
receiving a status notification from a power management unit (PMU), wherein the status notification provides a status of at least one of power, voltage, or current of a device, the status notification being in response to an interrupt signal; and
providing for transmission a state command to the PMU, wherein instructions that indicate a sequence of power operation modifications for one or more components of the device are adaptively determined based upon at least the state command and power usage during operation of the one or more components of the device, wherein an order of the sequence is independent of a time duration between any two temporally adjacent power operation modifications, and wherein each power operation modification of the sequence of power operation modifications comprises power operation modification of a different component of the one or more components of the device.

32. The computer-implemented method of claim 31, wherein the state command comprises at least a request to modify a power setting of at least one of the one or more components of the device, the device being configured to implement the request.

33. The computer-implemented method of claim 31, wherein the state command is associated with a sequence of functions for modifying a power setting of at least one of the one or more components of the device, the device being configured to implement the sequence of functions.

34. The computer-implemented method of claim 31, wherein the device comprises the PMU.

* * * * *